Figure 1:
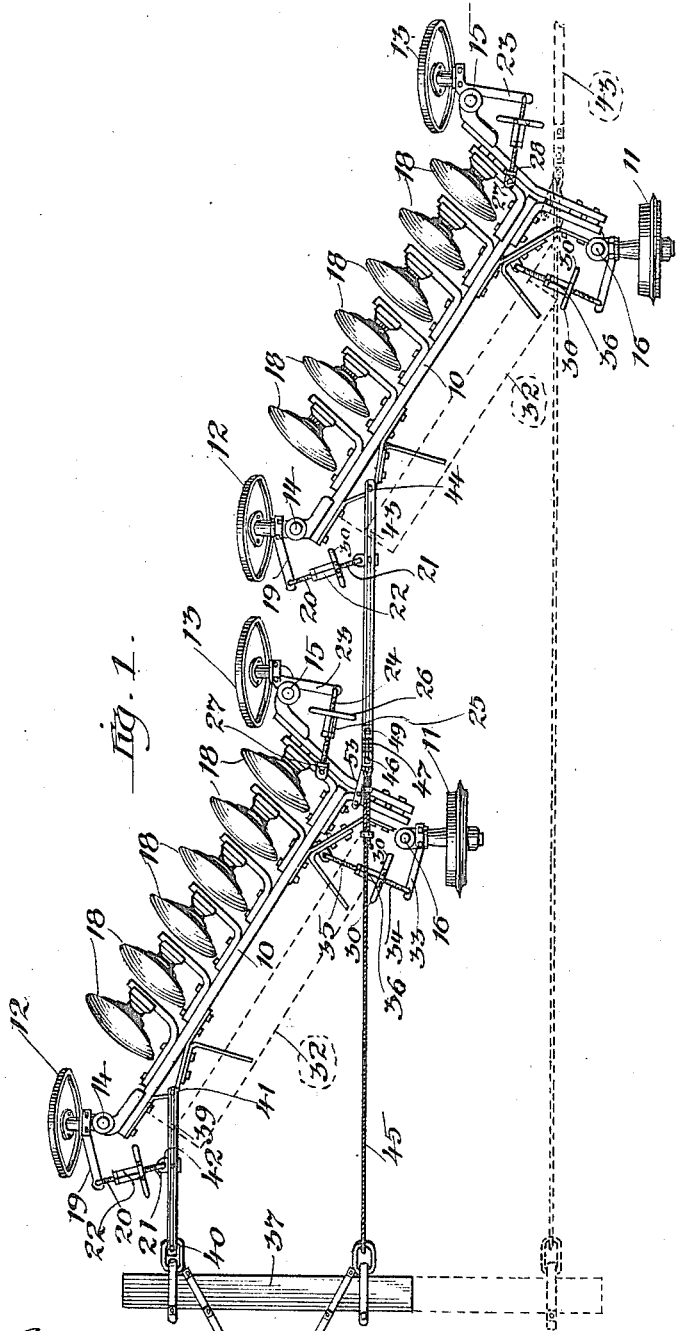

F. E. DAVIS & W. W. CAMERON.
PLOW.
APPLICATION FILED APR. 18, 1912.

1,232,661.

Patented July 10, 1917.
2 SHEETS—SHEET 1.

Witnesses
Frank J. Blanchard
Mildred A. Stumpf

Inventors:
Frank E. Davis & William W. Cameron
By Fred Gurlach
Their Attorney

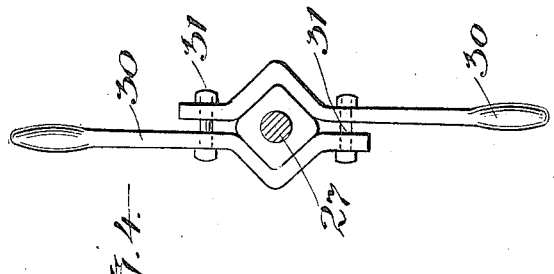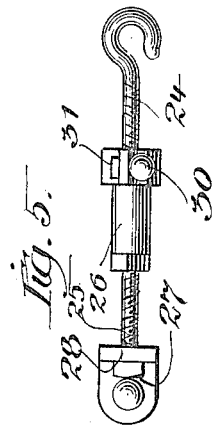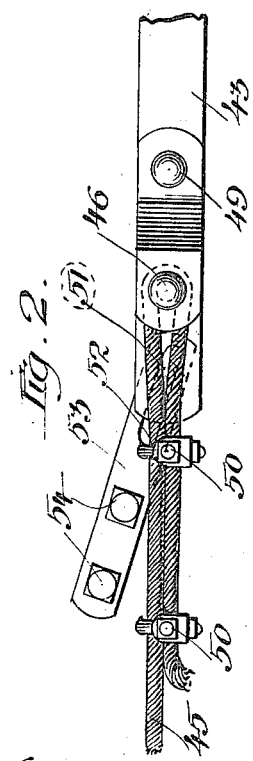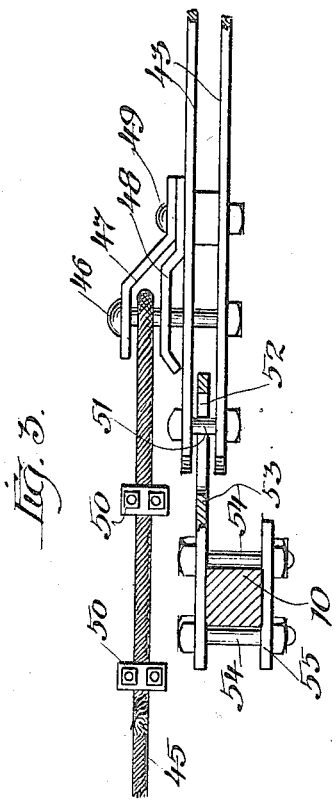

UNITED STATES PATENT OFFICE.

FRANK E. DAVIS AND WILLIAM W. CAMERON, OF LA CROSSE, WISCONSIN, ASSIGNORS TO LA CROSSE PLOW COMPANY, OF LA CROSSE, WISCONSIN, A CORPORATION OF WISCONSIN.

PLOW.

1,232,661.  Specification of Letters Patent.  Patented July 10, 1917.

Application filed April 18, 1912. Serial No. 691,572.

*To all whom it may concern:*

Be it known that we, FRANK E. DAVIS and WILLIAM W. CAMERON, both residents of La Crosse, in the county of La Crosse and State of Wisconsin, have invented new and useful Improvements in Plows, of which the following is a full, clear, and exact description.

The present invention relates to wheeled plows. One object of the invention is to provide improved means whereby two or more complete plows may be connected together for operation by a tractor, each plow being substantially complete in itself so that it may be operated singly, if desired, and so that by employment of the improved draft-appliances, they may be conjointly operated by a tractor.

Another object of the invention is to provide a simple device for adjusting the angularity of the furrow-wheels relatively to the line of draft whereby any irregular running or crowding due to the side thrust resulting from the plow-shares may be corrected while the plows are in operation without the use of any adjusting levers.

Lastly the invention designs to provide certain features of improvement hereinafter set forth.

The invention consists in the several novel features hereinafter set forth and more particularly defined by claims at the conclusion hereof.

In the drawings: Figure 1 is a plan of a pair of plows having the invention applied thereto. Fig. 2 is an enlarged detail plan of the draft-connection for the draft-link for the rear plow and the connection between said link and the front plow. Fig. 3 is a side elevation of the same. Fig. 4 is a detail of the adjusting devices employed in the steering-connections for the furrow-wheels. Fig. 5 is a detail plan of a portion of the steering-connection for the rear furrow-wheel of each plow.

Each plow comprises a frame 10, a land-wheel 11 adjustably connected to the frame as usual in the art, a front furrow-wheel 12 and a rear furrow wheel 13 both of which are also dirigibly connected to the frame, being mounted upon rotatable standards 14 and 15 respectively. Land-wheel 11 is mounted on a standard 16 which is also rotatably connected to the frame. The plow-frame 10 carries a series of plowing-disks or shares 18, in manner well understood in the art.

The turning of the front wheel of each plow is controlled by a connection between its draft-link and an arm 19 secured to the lower portion of standard 14, and comprises right and left screws 20 and 21 and a turnbuckle 22 between the screws. The turning of the rear furrow-wheel 13 of each plow is controlled in the one direction by an arm 23 which is secured to the axle on standard 15 on which said wheel is journaled, and a connection between said arm and the frame 10 which comprises right and left screw-threaded rods 24 and 25 with a turn-buckle 26 therebetween. Screw 24 is pivotally connected to the outer end of arm 23 and the front end of each screw 25 extends through a lug or bracket 27 which is secured to the frame, and a head 28 on screw 25 in the front of said lug serves as an abutment for limiting the movement of the connection in one direction, that is, to limit the turning of said furrow-wheel toward "land" and leaves the furrow-wheel free to caster when the plow is pulled to the right, that is, away from the land. This feature, in plows which are pulled by tractors, facilitates the turning of the plows so that when the tractor is turned toward land, the rear furrow-wheel of each plow will be free to assume a natural position without causing the wheel to be dragged laterally, and also makes it unnecessary to provide steering-connections for the rear furrow-wheels which are connected to the draft appliances.

In tractor-plows, it has been found that a screw-and-turn buckle adjustment for the wheels permits adjustment of the angle at which these wheels will travel relatively to the line of draft, to overcome the crowding of the plow from a direct course and toward land. Objection, however, to the employment of this form of adjustment, has been, that it was necessary to arrest the operation of the plow in order to effect the desired adjustment when necessary. To overcome this objection, a pair of handles 30 is secured to each of the turn-buckles 22 and 26 which are formed to fit around one of the squared ends of the turn-buckles and are adapted to be clamped thereto by bolts 31. Resultantly, when the plows are in operation, and it is desired to overcome by adjustment of the furrow-wheels any tendency of the plow to travel out of a true course, it is only necessary for the operator to turn handles 30, which can be done by the operator from a running board 32 which is usually mounted on the frame of each plow.

An arm 33 is secured to the axle of land-wheel 11 which is on standard 16, and this arm is adjustably connected to the frame by right and left screws 34 and 35 and a turn-buckle 36, so that the land-wheel may also be adjusted to rectify any tendency of the plow to travel out of a true course. Turn-buckle 36 is also provided with handles 30 similar to those on turn-buckles 22 and 26 so that angularity of the land-wheel may also be adjusted while the plow is in operation. Each plow comprises carrying-wheels in sufficient number so that each constitutes a complete unit with a series of disks and so that each plow may, if desired, be operated independently of the other.

The draft-appliances for adapting a plurality of plows to be pulled by a tractor comprises a cross-bar or evener 37 which is provided with a suitable coupling 38 which is adapted to be attached to the tractor. A draft-link 39 composed of dual bars has its front end pivotally connected as at 40, to evener 37 and its rear end pivoted as at 41, to the plow-frame 10 of the front plow. This link 39 constitutes the draft connection for the front plow, whereby that plow will be pulled and the connection 21, 22, 20 and 19 for controlling the front furrow-wheel is connected to said link, by a lug 42 in which screw 21 is pivoted, so that this link, when the tractor is turned will cause the front furrow-wheel of the front plow to be turned in the same direction.

The draft-connection for the rear plow comprises a link 43 which is formed of dual members having their rear ends pivotally connected, by bolts 44 to the frame of the rear-plow 10, and the front end of this link is flexibly connected to the evener 37 by a cable 45 which is secured to a bolt 46 which extends through both members of the link 43 and braces 47 and 48 which are secured to said link by bolt 49. Cable 45 is looped around bolt 46 and clamps 50 secure the end of the cable to the reach thereof between bolt 46 and the cross-bar 37. As a result of this construction, the rear plow is drawn by a draft-connection comprising a cable 45 and link 43 which is independent of the front plow so that it is not necessary to pull the rear plow through the frame of the front plow, that is, so that the frame of the front plow will not be subjected to the draft-stresses of the rear plow. Link 43, which is part of the draft-connection for the rear plow which serves also to space the plows in fore-and-aft direction, being connected to the frame 10 of the front plow by bolt 51 which extends through the front end of the members of link 43 and through an elongated slot 52 in a bar 53 which is secured to the front frame 10 by bolts 54. This loose or sliding connection permits the cable 45 to pull each plow independently of the front plow when the plows are being pulled in the forward direction, and when the tractor is turned in either direction, the draft-link 43 becomes operative to space the plows and to cause the rear plow to follow the front plow. Draft-link 43 for the rear plow is connected to its front furrow-wheel 12 by a connection similar to that between draft-link 39 and the front furrow-wheel 12 of the front-plow, so that when the front plow is swung in either direction, it will act upon link 43 to steer the rear plow. Bar 53, bolts 54, and a plate 55, constitute a clamp which may be conveniently attached to any desired portion of the leading plow frame, or to a frame of usual construction. It will be understood that the pivotal connections for the rear draft-links are loose to permit relative vertical variation between the plows.

It will be understood that the invention may be applied to any number of plows by applying a draft-connection to each plow and a coupling between each trail-plow and the plow in front of it, as shown by dotted lines in Fig. 1 of the drawings.

The invention thus exemplifies a simple draft appliance and coupling between the plows which is adapted for operation of a number of plows from the tractor, each plow being a complete unit and adapted for independent operation since the draft appliances can be disconnected from the plow. Also, that the draft appliances pull the plows independently, and the couplings between the plows serve to steer the trail plows in turning.

Having thus described the invention, what we claim as new and desire to secure by Letters Patent, is:

1. The combination with a plurality of plows, each provided with a plurality of ground tools, and three carrying wheels whereby each plow is sustained independently, of a draft appliance for pulling the plows in trailing order comprising an evener, a draft-connection between the evener and the front end of the front plow, a draft-link for the trail plow, a connection between the front end of the draft-link for the trail plow and the evener, a pivotal connection between the front end of the draft link for the trail plow and the front plow, and means for permitting limited movement in fore and aft direction of the draft-link for the trail plow while it is in pivoted connection with the front plow.

2. The combination with a plurality of plows, each provided with a plurality of ground-tools and carrying-wheels whereby one of the plows is sustained independently of the other, of a draft appliance for pulling the plows in trailing order, comprising an evener, a draft-link between the evener-bar and the front plow, a draft-link for the trail plow, a connection extending between the draft-link for the trail-plow and the evener, a pivotal connection between the draft-link for the trail plow and the front plow, and means permitting the draft-link for the trail-plow to move in fore-and-aft direction relatively to the front plow.

3. The combination with a plurality of plows, each provided with a plurality of ground-tools and carrying-wheels whereby each plow is sustained independently of the other, of a draft appliance for pulling the plows in trailing order, comprising an evener, a draft-link between the evener-bar and the front-plow, a draft-link for the trail-plow, a flexible connection extending between the draft-link for the trail-plow and the evener, a pivotal connection between the draft-link for the trail-plow and the front plow, and means permitting the draft-link for the trail-plow to move in fore-and-aft direction relatively to the front plow.

4. The combination with a plurality of plows, each provided with a plurality of ground-tools and carrying-wheels whereby each plow is sustained independently of the other, of a draft appliance for pulling the plows in trailing order, comprising an evener, a draft-link between the evener and the front plow, a draft-link for the trail plow, a connection between the draft-link for the trail-plow and the evener, and a sliding pivotal connection between the draft-link for the trail-plow and the front plow.

5. The combination with a plurality of plows, each provided with a plurality of ground-tools and carrying-wheels whereby each plow is sustained independently of the other, of a draft-appliance for pulling the plows in trailing order, comprising an evener, a draft-link between the evener bar and the front-plow, a draft-link for the rear plow, a connection extending between the link for the trail plow and the evener, a clamp on the front plow, a pivotal connection between the draft-link of the trail-plow and the clamp, and means permitting the link to move in fore-and-aft direction relatively to the front plow.

6. The combination with a plurality of plows, each provided with a plurality of ground-tools, carrying-wheels whereby each of the plows is sustained independently of the other, a draft-appliance for pulling the plows in trailing order, comprising an evener, a draft-link between the evener and the front plow, a draft-link for the rear plow, a connection extending between the link for the trail-plow and the evener, a clamp on the front plow and a pivot pin connecting the clamp and the draft-link for the trail-plow, said clamp having a slot therein through which said pin extends.

FRANK E. DAVIS.
WILLIAM W. CAMERON.

Witnesses:
P. A. PEDERSON,
H. W. ROBINSON.

Copies of this patent may be obtained for five cents each, by addressing the "Commissioner of Patents, Washington, D. C."